No. 846,161. PATENTED MAR. 5, 1907.
T. STRAIN.
FRUIT BRUSHING MACHINE.
APPLICATION FILED NOV. 9, 1906.
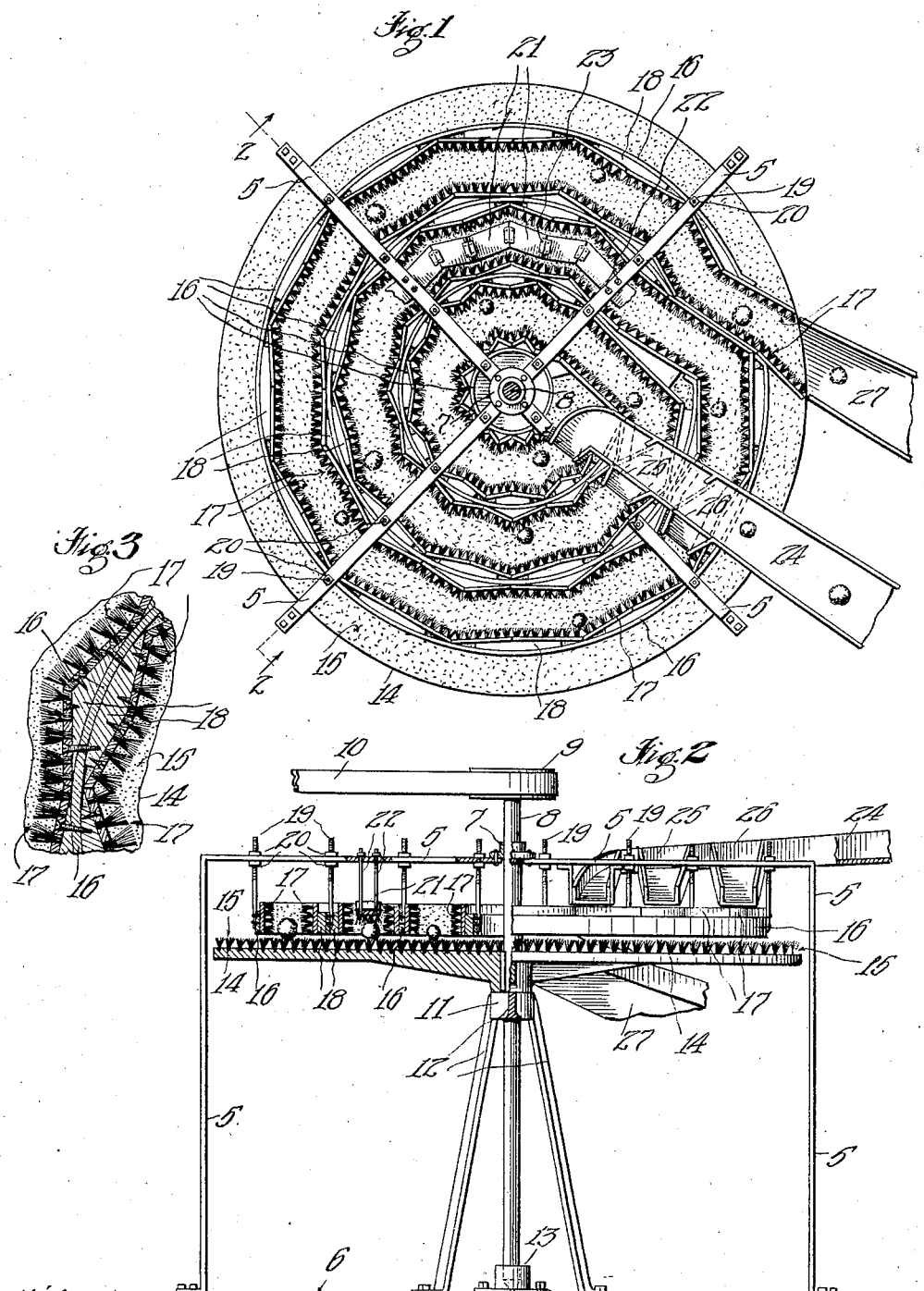

UNITED STATES PATENT OFFICE.

THOMAS STRAIN, OF NEAR FULLERTON, CALIFORNIA.

FRUIT-BRUSHING MACHINE.

No. 846,161.  Specification of Letters Patent.  Patented March 5, 1907.

Application filed November 9, 1906. Serial No. 342,592.

*To all whom it may concern:*

Be it known that I, THOMAS STRAIN, a citizen of the United States, residing near Fullerton, in the county of Orange and State of California, have invented new and useful Improvements in Fruit-Brushing Machines, of which the following is a specification.

It is the object of my invention to produce a machine for brushing the outside of fruit to remove the dirt therefrom of compact form and of great capacity and which will separate the pieces of fruit as they pass through the machine, so that one piece will not rub against another while being brushed and which will brush all parts of the fruit. I accomplish these objects by means of the machine described herein and illustrated in the accompanying drawings, in which—

Figure 1 is a plan view of my improved machine. Fig. 2 is a side elevation, partly in central vertical section, of my improved machine. Fig. 3 is a detail showing the manner of uniting the brushes.

Since filing my application for a patent on a fruit-brushing machine, Serial No. 292,287, filed December 4, 1905, I have found that better results can be obtained by making concentric channels, the sides of which are formed by sections of brushes set in a serpentine form, with outlets or connections from one concentric channel to the other, and I have also found that by making the top brush in sections yieldingly connected together and to the frame that the same will drop down into the channels, and thereby contact with the top of the small orange equally well as with that of a large orange.

In the drawings the frame 5 is represented as being bolted to the floor, the upper line 6 only being shown. The top of the frame is preferably in the shape of a cross, as best shown in Fig. 1. At the meeting-point of the members at the top of the frame is secured a bearing 7, through which and through the top members passes the vertical operating-shaft 8, which is provided at its top with a pulley 9, which is rotated by a belt 10, driven by a mechanism not shown. This operating-shaft also passes through a bearing 11, secured to braces 12, and which braces are shown as bolted to the floor.

The lower end of the operating-shaft rests in a cup-shaped bearing 13, shown as bolted to the floor. Rigidly secured to the operating-shaft between the bearings 7 and 11 is the circular flat bottom brush 14, whose upper face is covered with bristles 15.

To the top of frame 5 is secured a plurality of circular concentric webs 16, which have openings therethrough, these openings being on a radial line. To both surfaces of these webs are secured short sections of straight brushes 17, set so as to form a serpentine surface, thereby producing a serpentine channel, as best illustrated in Fig. 1. The manner of securing these brushes to the web is best illustrated in Fig. 3, where the brushes are shown partially secured to the back blocks 18. These webs are adjustably supported by bolts 19, which pass through the cross-bars of the frame. The top ends of these bolts are threaded and provided with nuts 20, so that the brushes may be adjusted toward and away from the bottom brush, so as to equalize as much as possible the wear on the side brushes. At the openings through these concentric webs the inner channel is connected to the channel next adjacent thereto by brushes which extend across the inner channel, and the next channel likewise is connected to the next outermost channel and the same is continued until the outer channel is reached, thereby making a continuous channel of stepped concentric circular form having serpentine sides.

To the cross-bars forming the top of the frame are adjustably secured the top channel-brushes 21 by means of bolts 22, and the various sections are hinged together by hinges 23, which are preferably strips of leather, which permit the channel-brush to rise and fall to accommodate itself to the size of the orange passing through the channel.

In Fig. 1 I have shown only a portion of these channel-brushes, the rest being only for clearness of illustration; but it will be understood that the whole or only a portion of the channel may be provided with these channel-brushes, as desired, the number depending upon the amount of brushing that the fruit requires.

In the operation of my brusher power is applied to rotate the operating-shaft, thereby rotating the bottom brush. The fruit is fed into the feeding-spout 24, which delivers them into the central portion of the machine, as shown in Fig. 1, if the fruit requires the maximum amount of brushing; but if the fruit requires only a moderate amount of brushing a gate 25 in the side of the spout is opened and the fruit is permitted to enter a channel removed from the center. If the fruit requires only a small amount of brushing, a gate 26 is opened, so as to discharge the fruit into an outermost portion of the channel. These gates when opened are thrown to the position shown in dotted lines in Fig. 1. The fruit passes out of the brusher into the delivery-spout 27.

By making the sides of the fruit-runway of concentric brushes horizontally undulating the fruit is retarded in its passage through the machine, thereby insuring greater efficiency in cleansing it.

By this construction a brusher of very compact form, very efficient, and of great capacity is provided, because the fruit can be carried therethrough very rapidly, its passage therethrough being regulated by the speed of rotation of the bottom brush. It will be observed that the channel formed by the concentric brush grows larger toward the outside and that the peripheral speed of the bottom brush is faster as the outer edge is approached, and for that reason the fruit increases its rate of travel through the brusher, thereby separating the different pieces of fruit so that one will not rub against another, which is a very great advantage, as less injury will occur to the fruit than happens when one piece rubs against another as it passes through the brusher.

In an application filed by me November 9, 1906, Serial No. 342,593, I have shown and described and claimed a brushing-machine in which the sides of the brushing-channel are formed of horizontally-undulating conchoidal brushes Having described my invention, what I claim is—

1. A fruit-brushing machine, comprising a flat horizontally-rotating bottom brush; vertical and horizontally-undulating brushes above said bottom brush and forming with the bottom brush a runway for the passage of the fruit through the machine, said brushes above said bottom brush being so arranged that the passage-way is circular in general outline.

2. A fruit-brushing machine, comprising a flat horizontally-rotating bottom brush; vertical and horizontally-undulating brushes above said bottom brush and forming with the bottom brush a runway for the passage of the fruit through the machine, said brushes above said bottom brush being so arranged that the passage-way is circular in general outline; a sectional top brush secured to the top of the frame and projecting into the said channel.

3. A fruit-brushing machine, comprising a flat horizontally-rotating bottom brush; a plurality of segmental webs concentric with each other and separated from each other secured above the bottom brush; a plurality of straight short brushes secured to said web, whereby a plurality of runways for the passage of the fruit through the machine are formed thereby together with the bottom brush, the vertical sides of said runways being serpentine; sectional top brushes secured to the top of the frame and projecting into said channels.

4. A fruit-brushing machine, comprising a flat horizontally-rotating bottom brush; a plurality of segmental webs concentric with each other and separated from each other adjustably secured above the bottom brush; a plurality of straight short brushes secured to said webs in serpentine form; brushes connecting the adjacent webs, whereby a continuous concentric stepped runway is formed by said webs and brushes and the bottom brush, the vertical sides of said runway being serpentine; and a sectional top brush secured to the top frame and projecting into the said channel.

In witness that I claim the foregoing I have hereunto subscribed my name this 2d day of November, 1906.

THOMAS STRAIN.

Witnesses:
G. E. HARPHAM,
EDMUND A. STRAUSE.